T. WENNDORF.
STREET CLEANING MACHINE.
APPLICATION FILED JAN. 29, 1919.
1,307,568.
Patented June 24, 1919.
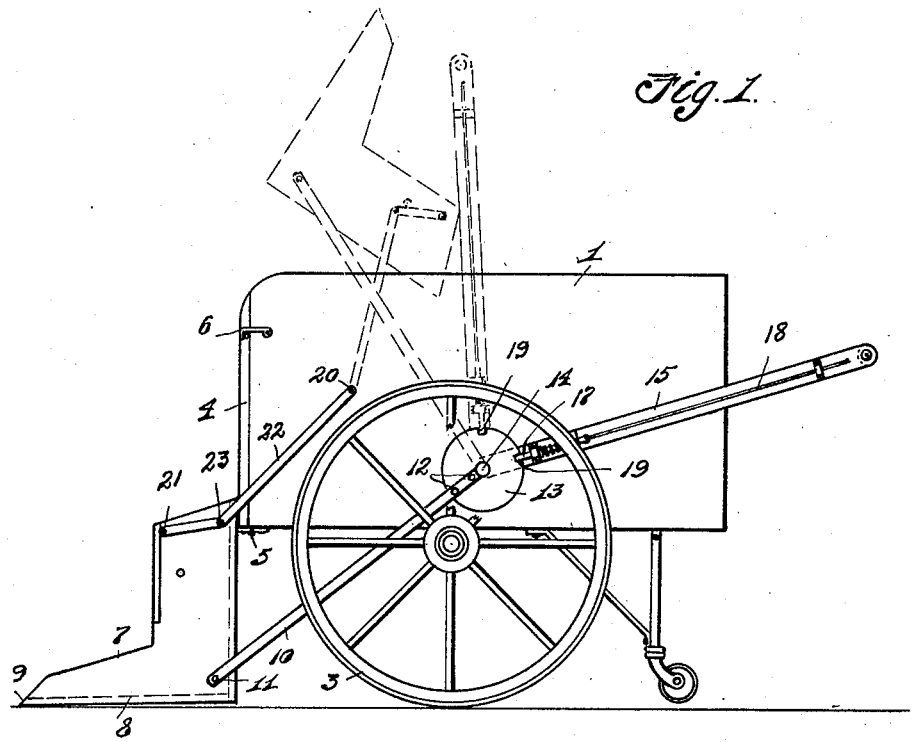
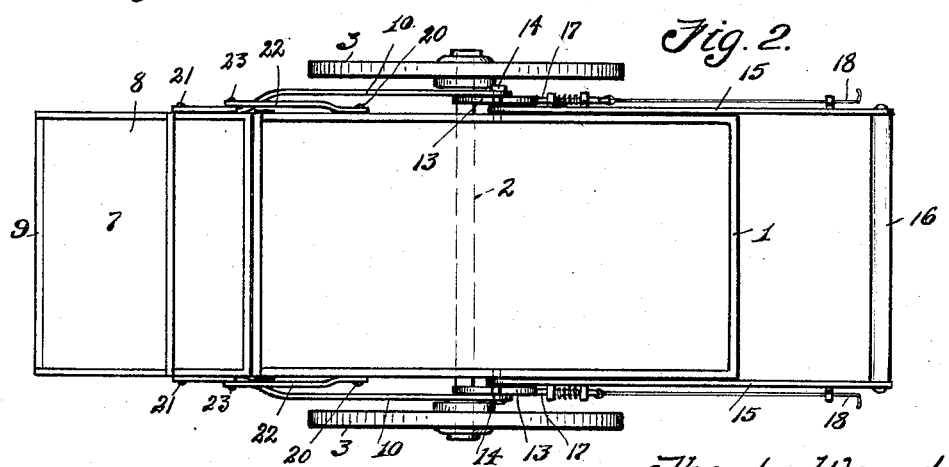
Theodor Wenndorf
INVENTOR
By George J. Itsch
ATTORNEY.

UNITED STATES PATENT OFFICE.

THEODOR WENNDORF, OF SOUTH BEND, INDIANA.

STREET-CLEANING MACHINE.

1,307,568.　　　　　Specification of Letters Patent.　　Patented June 24, 1919.

Application filed January 29, 1919.　Serial No. 273,874.

*To all whom it may concern:*

Be it known that I, THEODOR WENNDORF, a citizen of the United States, residing at South Bend, in the county of St. Joseph and State of Indiana, have invented certain new and useful Improvements in Street-Cleaning Machines, of which the following is a specification.

The invention relates to a street cleaning machine, and more particularly to that type of machine, adapted for the purpose, in which the refuse gathered by a scraper, or brushed thereon, may be easily and conveniently dumped into a receptacle forming a part of the machine.

The object of the invention resides in the provision of a street cleaning machine mounted on wheels, and adapted to be pushed along in a manner to permit a scraper carried thereby to gather up the street refuse, and means serving both as a handle for manipulating the machine and as a part adapted for raising the scraper to dumping position with relation to a receptacle, whereby the structure, through the dual function of the handle, will be of exceedingly simple form and relatively cheap of manufacture. A further object resides in the provision of a machine of the character stated, comprising a refuse gathering scraper so arranged and supported by manually operable means as to be easily raised to a point above a receptacle for dumping therein.

With the above and other objects in view, the invention in the preferred form of details will be described in the following specification, reference being had particularly to the accompanying drawings, in which:—

Figure 1 is a side elevation of the improved machine, the parts being shown when moved to dumping position for the scraper by dotted lines in the movement of handle from the dotted line position to normal position.

Fig. 2 is a plan view with the parts shown in normal position.

Referring now more particularly to the drawings, the machine includes a box-like receptacle 1, having an open upper side, which is mounted upon an axle 2 supported by the wheels 3, and provided with an end gate 4, hingedly connected at its lower end, as at 5, with the bottom of the receptacle, a catch 6 holding the gate in closed position. By opening said gate and tilting the machine so as to lower its forward end and raise its rear end, the contents of the receptacle may be easily and quickly dumped, as will be apparent.

Supported at the forward end of the receptacle is a scraper 7, preferably of the same width as the former, having a box-like formation at its upper portion open at both its upper and under sides, and a bottom 8 extending forwardly of said upper portion to provide a platform of liberal dimensions for the reception of the refuse. The scraping edge 9 of the scraper may be brought in contact with the pavement by tilting the machine as a whole, as will be obvious.

The scraper is supported partly by abutting with the receptacle at its upper end as shown, and by lifting bars 10 suitably pivoted at 11 to the lower side walls thereof, the opposite ends of said bars being fixedly secured, as by means of rivets 12, to disk 13, rotatably mounted upon pins 14 secured to and extending from the side walls of the receptacle. Also mounted upon said pins 14 for pivotal movement are side bars 15, connected at their outer ends by a handle bar 16, the side bars carrying spring pressed latch bolts 17, operable by means of the handles 18, and adapted for engagement with the notches 19 in the disks 13, whereby the handle may be adjusted with relation to said disks.

Pivotally connected to the sides of the receptacle, as at 20, and to the sides of the scraper, as at 21, are arms 22 having elbow-joints 23, which arms are designed to guide the scraper in the upward movement thereof, and by breaking at said joints permits the scraper to dip at its discharge end, as distinctly shown in Fig. 1 by dotted lines, and thus automatically dump its contents into the receptacle.

Referring to Fig. 1, the parts, as shown by full lines, are in their normal positions, that is—the handle for manipulating the machine as well as the scraper are in their proper positions for pushing the machine and gathering up the street refuse in such movement thereof. In order to raise the scraper to dumping position, the handle is moved to the position shown by dotted lines and locked against independent movement with respect to the disks 13, and thence swung downwardly to its original or normal position, which action results in raising the scraper upwardly and to a point above the receptacle. The dumping of the receptacle itself is, of course, accomplished when the scraper is in raised position, so as not to interfere with the opening of the receptacle end gate and tilting of the receptacle.

While the foregoing is the preferred form of my invention, I desire it to be understood that I do not limit myself to the precise structure shown and described, as it is obvious that the same may be variously modified without departing from the spirit of the invention.

Having thus described my invention, what is claimed is:—

1. A wheeled cart including a dump box, a scraper, means fulcrumed on the cart jointly forming an angle lever, one arm of the said lever being connected with the scraper and the other forming a handle for manipulation of the cart, means permitting relative angular adjustment between the lever arms, and means for locking the lever arms against independent movement.

2. A wheeled cart including a dump box, a scraper, lift bars pivotally connected at their terminals with the scraper and the box for the support and elevation of the scraper, a handle having side bars pivotally coincident at one end with one end of the lift bars, and means for locking the side bars and lift bars against independent pivotal movement.

3. A wheeled cart including a dump box, a scraper, lift bars for the scraper pivotally supported on the box, handle bars pivotally coincident with the lift bars, notched rotative elements axially coincident with the bar pivots and fixed to the lift bars, and latch elements carried by the handle bars for engagement with the notches of said elements for adjustably locking the lift and handle bars in relative angular relation.

In testimony whereof I affix my signature.

THEODOR WENNDORF.

Copies of this patent may be obtained for five cents each, by addressing the "Commissioner of Patents, Washington, D. C."